(12) United States Patent
Kutsch

(10) Patent No.: US 12,080,441 B2
(45) Date of Patent: Sep. 3, 2024

(54) HYDROGEN PRODUCTION SYSTEM AND METHOD OF USING SAME

(71) Applicant: Whole World LLC, Harvard, IL (US)

(72) Inventor: John Kutsch, Harvard, IL (US)

(73) Assignee: Whole World LLC, Harvard, IL (US)

( * ) Notice: Subject to any disclaimer, the term of this patent is extended or adjusted under 35 U.S.C. 154(b) by 0 days.

(21) Appl. No.: 18/240,222

(22) Filed: Aug. 30, 2023

(65) Prior Publication Data

US 2024/0079159 A1    Mar. 7, 2024

Related U.S. Application Data

(60) Provisional application No. 63/374,753, filed on Sep. 7, 2022.

(51) Int. Cl.
| | | |
|---|---|---|
| G21H 5/00 | (2006.01) | |
| C01B 3/04 | (2006.01) | |
| C25B 1/042 | (2021.01) | |

(52) U.S. Cl.
CPC .............. *G21H 5/00* (2013.01); *C01B 3/042* (2013.01); *C25B 1/042* (2021.01); *C01B 2203/0272* (2013.01); *C01B 2203/06* (2013.01)

(58) Field of Classification Search
None
See application file for complete search history.

(56) References Cited

U.S. PATENT DOCUMENTS

| | | |
|---|---|---|
| 1,329,559 A | 2/1920 | Tesla |
| 3,286,992 A | 11/1966 | Armeniades et al. |
| 5,650,051 A | 7/1997 | Wada et al. |

FOREIGN PATENT DOCUMENTS

| | | |
|---|---|---|
| CN | 115231518 A | 10/2022 |
| MD | 2398 F1 | 3/2004 |
| RU | 1824375 C | 6/1993 |

OTHER PUBLICATIONS

Caer, "Water Radiolysis: Influence of Oxide Surfaces on H2 Production Under Ionizing Radiation," Water, vol. 3, published Feb. 28, 2011, 19 pages.
Cecal et al., "On the Hydrogen Production by Catalyzed Radiolysis of Water," Revue Roumaine de Chimie, vol. 53 Issue 3, published Mar. 2008, 5 pages.
Dzaugis et al., "Radiolytic Hydrogen Production in the Subseafloor Basaltic Aquifer," Frontiers in Microbiology, vol. 7, published Feb. 4, 2016, 12 pages.
International Search Report and Written Opinion issued in connection with International Patent Appl. No. PCT/US2023/031732, dated Jan. 29, 2024, 12 pages.

*Primary Examiner* — Colin W. Slifka
(74) *Attorney, Agent, or Firm* — KLINTWORTH & ROZENBLAT IP LLP

(57) ABSTRACT

A reactor block to extract hydrogen from water includes a plurality of reactor plates bonded to one another and a plurality of channels formed on at least one side of each reactor plate. Each channel is coupled to a first opening and a second opening disposed on opposite first and second edges of the reactor plate, and a radioactive coating is applied to each channel. The first opening is configured to receive gasified water and the second opening is configured to eject hydrogen generated by radiolysis of at least a portion of the gasified water as the gasified water is passed through the channel coupled to the second opening.

20 Claims, 14 Drawing Sheets

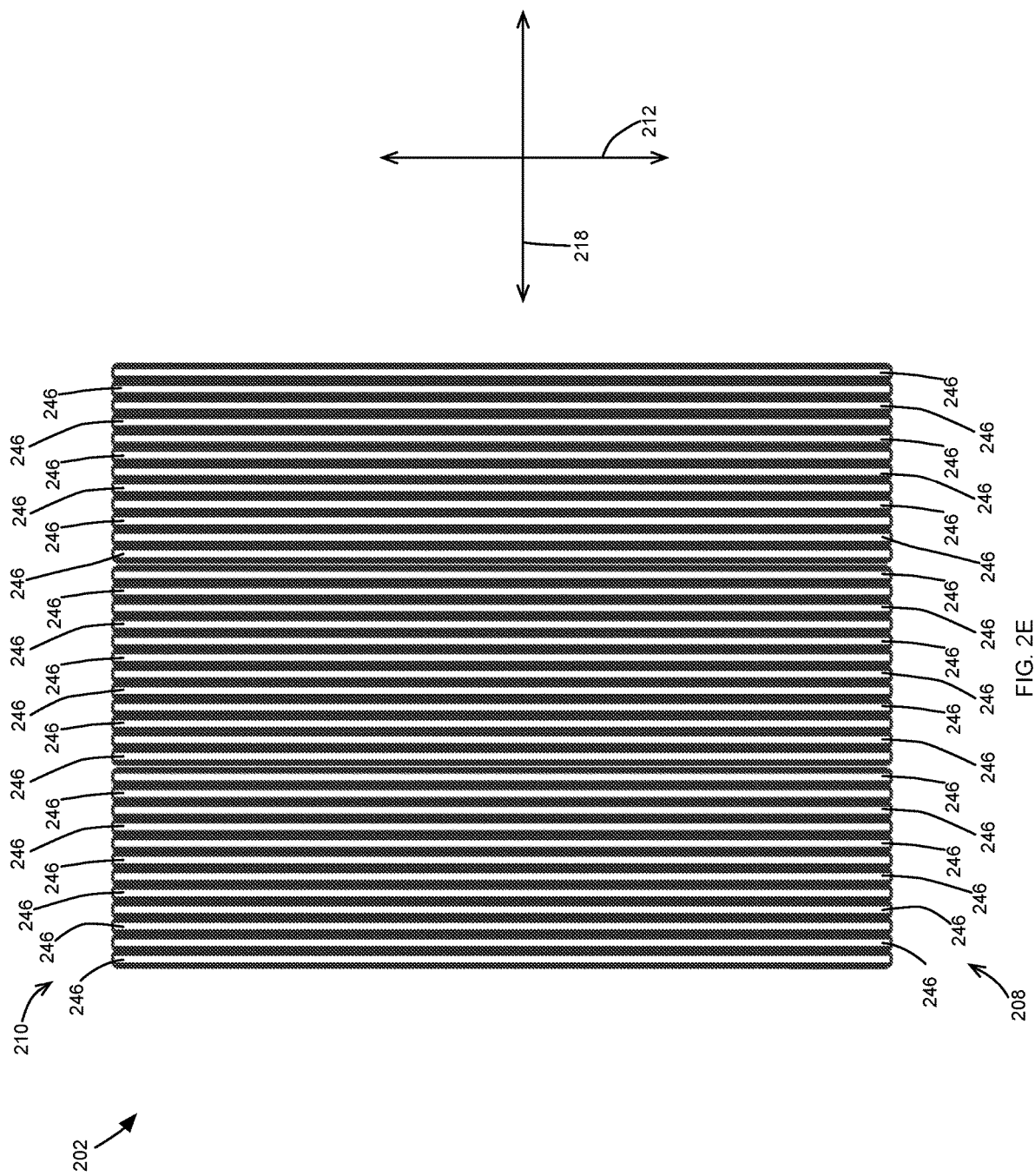

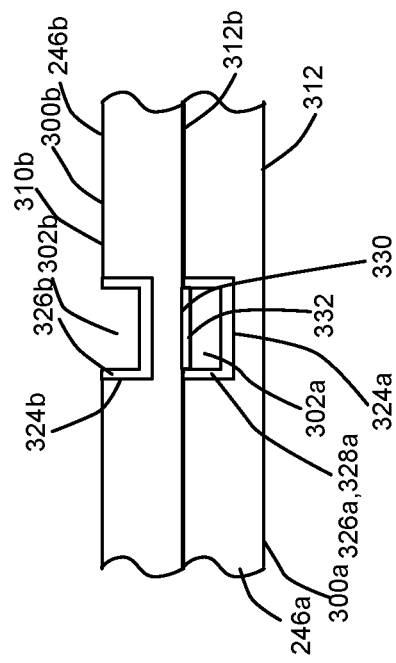
FIG. 3B
FIG. 3A
FIG. 3C

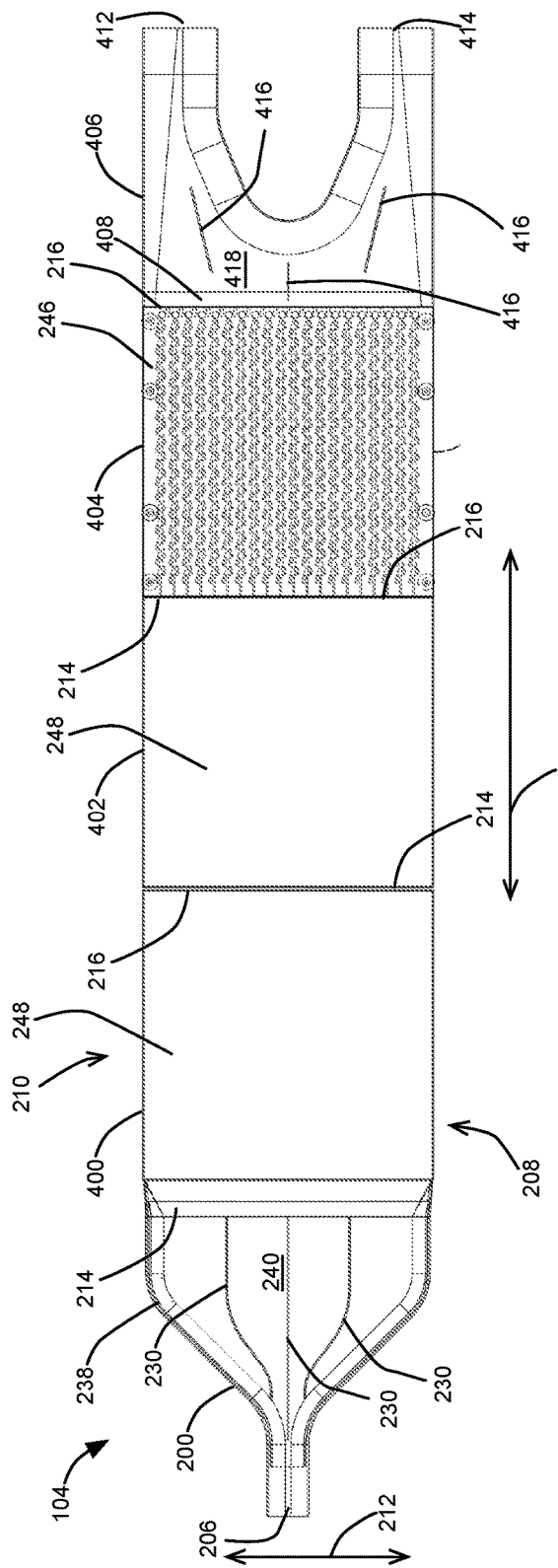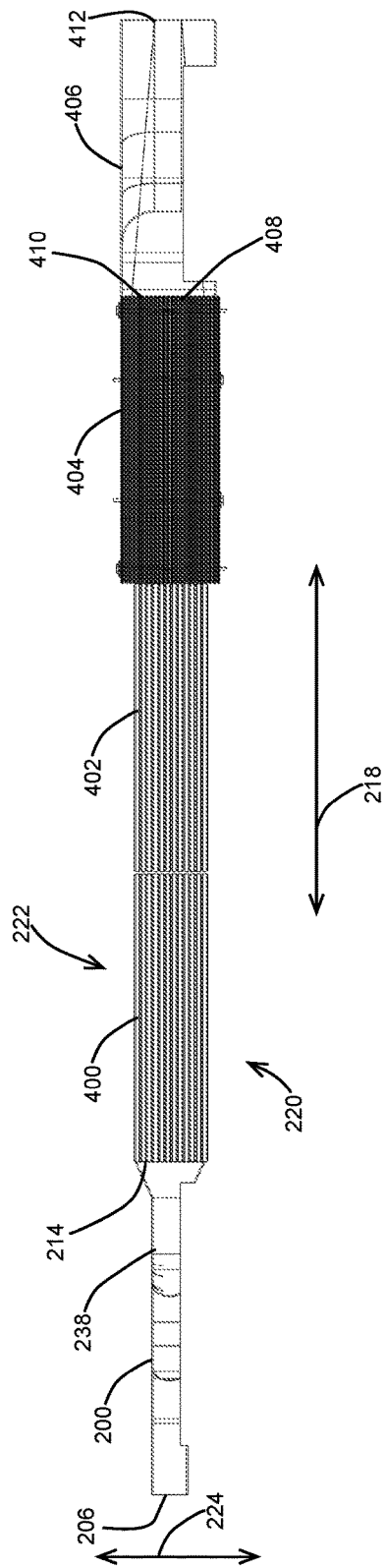

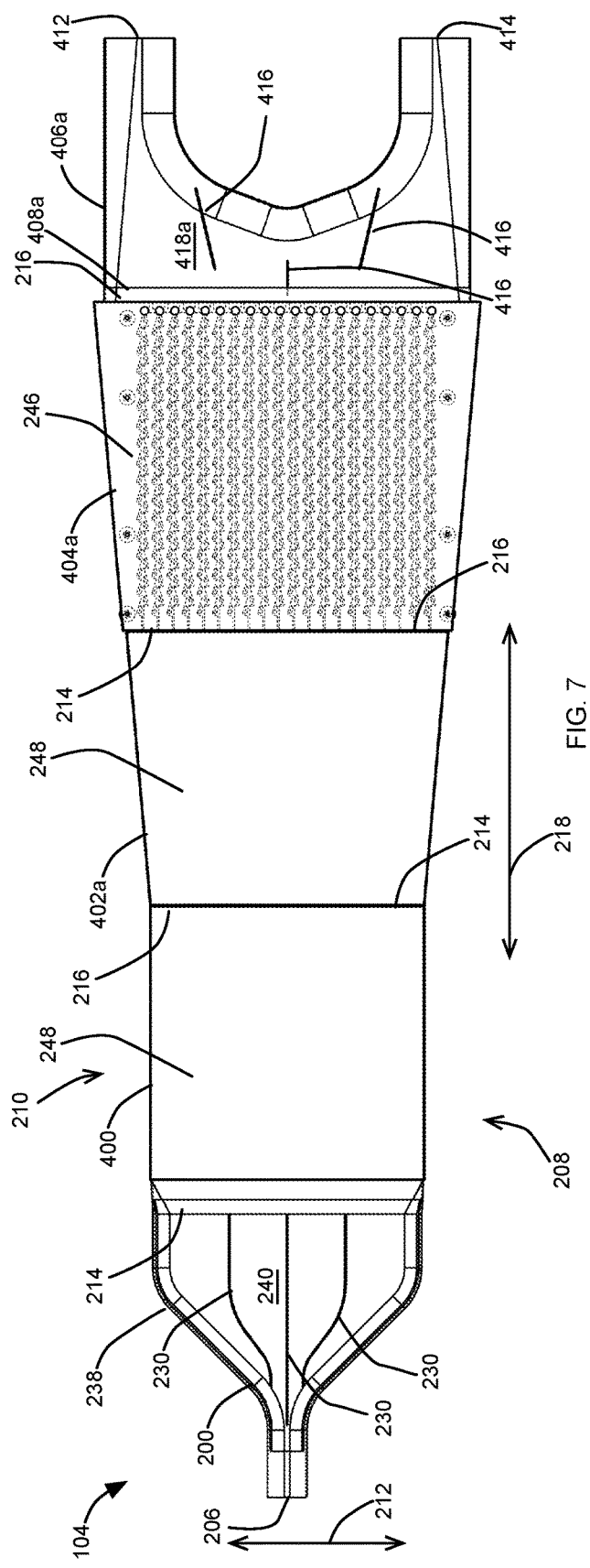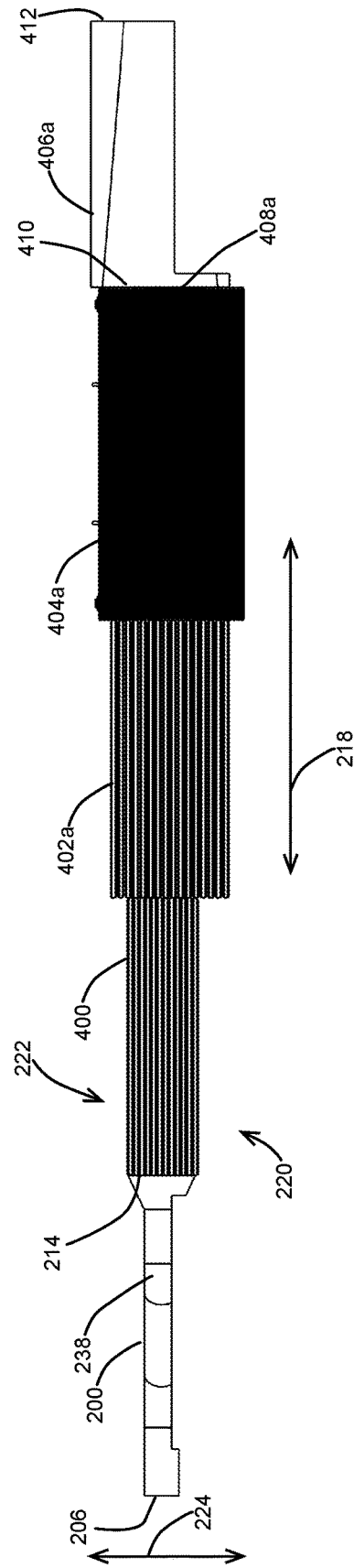

HYDROGEN PRODUCTION SYSTEM AND METHOD OF USING SAME

CROSS-REFERENCE TO RELATED APPLICATION

The present application claims benefit of Kutsch, U.S. Provisional Patent Appl. No. 63/374,753, filed Sep. 7, 2022, and entitled "Radiolysis Device Using Thorium."

FIELD OF THE DISCLOSURE

The present subject matter relates to systems and methods for generating hydrogen from water and more particularly, to a device and method of using such device to generate hydrogen using radiolysis of water.

BACKGROUND

Hydrogen in either gas or liquid states has various industrial and power generation applications. For example, hydrogen may be used to hydrogenate fuels, create saturated fats from unsaturated fats, produce compounds such as methanol, ammonia, hydrochloric acid, and the like, and to convert certain ores into metal. Hydrogen also holds promise as a clean fuel that may be combusted with oxygen to generate heat or combined with oxygen in a fuel cell to generate electricity directly. The byproduct of using hydrogen as a fuel source is water and thus environmentally friendly.

Although hydrogen is the most abundant substance in the universe, hydrogen on earth is usually bound in compounds such as hydrocarbons, water, and the like. Extracting hydrogen from such compounds requires significant amounts of energy to break the bonds that hold such compounds together. Further, extracting hydrogen from hydrocarbons may generate additional compounds that are not considered environmentally friendly.

Although water is abundant on earth, splitting a water molecule using conventional methods such as electrolysis, steam reforming, and the like requires a significant amount of energy such that using the resultant hydrogen as a fuel source is not economically and/or environmentally feasible.

SUMMARY

According to one aspect, a reactor block to extract hydrogen from water includes a plurality of reactor plates bonded to one another. A plurality of channels is formed on at least one side of each reactor plate, each channel coupled to a first opening and a second opening disposed on opposite first and second edges of the reactor plate, and a radioactive coating applied to each channel. The first opening is configured to receive gasified water and the second opening is configured to eject hydrogen generated by radiolysis of at least a portion of the gasified water as the gasified water is passed through the channel coupled to the second opening.

According to another aspect, a method of extracting hydrogen from water includes introducing gasified water into a first opening of each channel of a plurality of channels formed on a reactor plate, wherein each channel is coated with a radioactive material. Ejecting from a second opening of each channel, hydrogen generated by radiolysis of at least a portion of the gasified water as the gasified water is passed through the channel.

Other aspects and advantages will become apparent upon consideration of the following detailed description and the attached drawings wherein like numerals designate like structures throughout the specification.

BRIEF DESCRIPTION OF THE DRAWINGS

FIG. 2E is a front planar view of a reactor block of the extractor of FIG. 2, with portions omitted for clarity;

FIGS. 3A through 3C are elevational views of portions of reactor plates of the reactor plate FIG. 3;

FIG. 5 is an elevational view of another embodiment of an extractor of the hydrogen production system of FIGS. 1 and 1A;

FIG. 5A is a top planar view of the extractor of FIG. 5;

FIG. 7 is an elevational view of a further embodiment of an extractor of the hydrogen production system of FIGS. 1 and 1A;

FIG. 7A is a top planar view of the extractor of FIG. 7;

DETAILED DESCRIPTION

Figure 1:
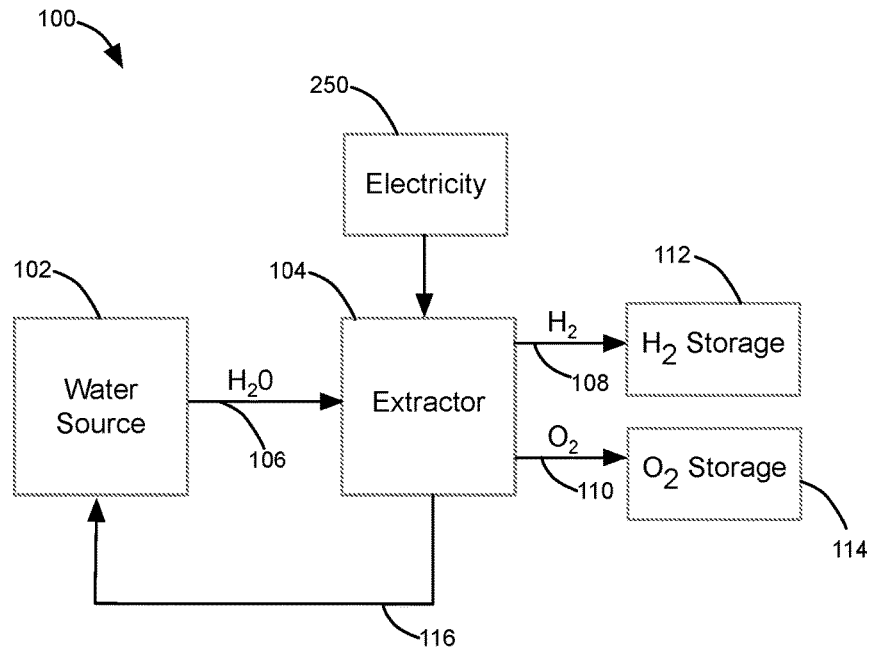
FIG. 1 is a block diagram of a hydrogen production system in accordance with the present disclosure.

FIG. 1 is a block diagram of a hydrogen production system 100 that generates hydrogen from water. Referring to FIG. 1, the hydrogen production system 100 includes a water source 102, an extractor 104, and a separator 106.

The water source 102 introduces gasified water (e.g., vaporized water, low quality steam, high quality dry steam, and the like) into the extractor 104 via a conduit 106. The conduit 106 comprises piping suitable for transporting heated gasified water between the water source 102 and the extractor 104. In some embodiments, the water source 102 may heat the water to between 400 and 700 degrees Celsius, or to an even higher temperature.

As described in greater detail below, the extractor 104 includes a plurality of channels coated with a radiation energy emitter such as thorium, other actinides, and the like and the water traverses through such channels. As the water traverses though these channels, the water molecules are exposed to an ionizing field produced by the radiation energy emitter. As would be understood by one of ordinary skill in the art, when a water molecule is exposed to the ionizing field, the water molecule undergoes radiolysis that disassociates the water molecule into hydrogen and oxygen gases. The channels are configured to provide a relatively long tortuous path through the extractor of 104 and thereby increase the dwell time of the gasified water therein and thereby increase the number of water molecules that are disassociated into hydrogen and oxygen.

Hydrogen and oxygen gasses generated within the extractor 104 exit therefrom and are directed via conduits 108 and 110 to storage tanks 112 and 114 respectively. Any water not dissociated while in the extractor 104 is directed via a conduit 116 to the water source 102 and reintroduced into the extractor 104.

Figure 1A:
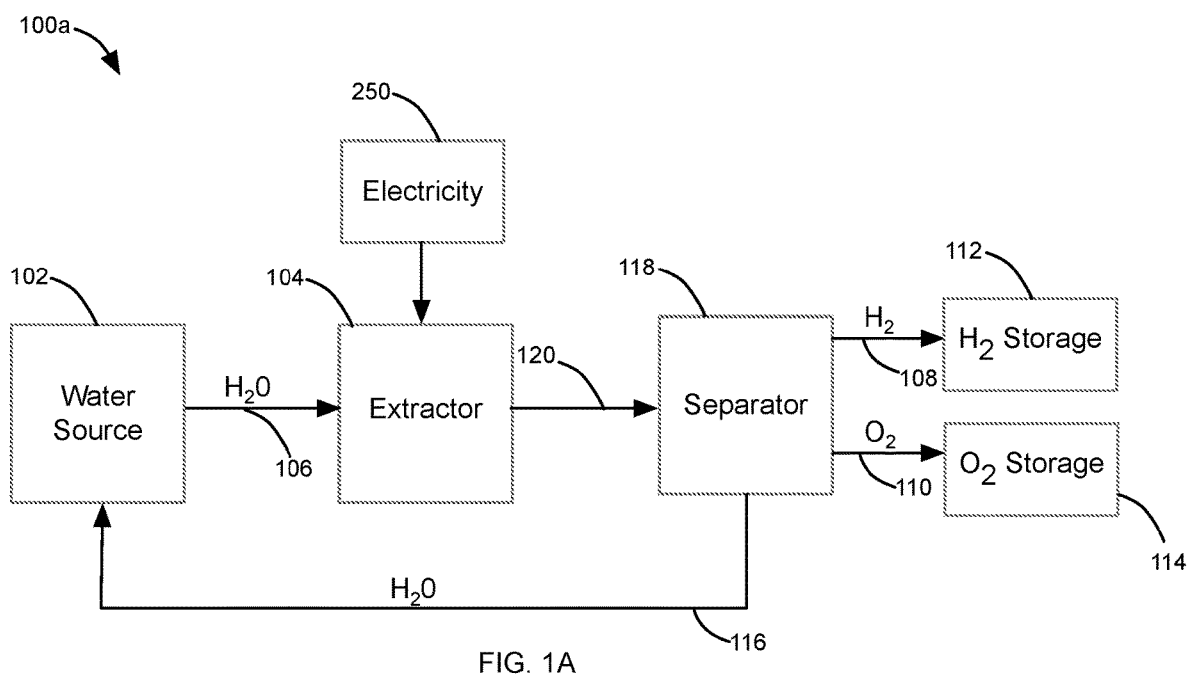
FIG. 1A is a block diagram of an alternate embodiment of the hydrogen production system of FIG. 1.

FIG. 1A shows an alternate configuration 100a of the hydrogen production system 100. The hydrogen production system 100a is substantially identical to the hydrogen production system 100 described above except a separation device 118 is disposed between the extractor 104 and the conduits 108, 110, and 116. In particular, gasses and disassociated water that exit the extractor 104 are directed into the separator device via a conduit 120. The separator device 118 separates such gasses into hydrogen, oxygen, and water and transports the separated gasses to the hydrogen storage tank 112, the oxygen storage tank 114, and the water source 102 via the conduits 108, 110, and 116. In some embodiments, the separator device is 118 is a cyclonic separator, a cryogenic cooler, and the like. Other types of separator devices such as selective separate mixtures on an atomic or molecular level apparent to one of ordinary skill in the art may be used. In some embodiments, the oxygen may be exhausted into the ambient environment instead of being directed to the storage tank 114.

Referring to FIGS. 2 and 2A-2E one embodiment of the extractor 104 includes an input header 200, a reactor block 202, and an offtake header 204. An input port 206 of the input header 200 is coupled to the water source 102 via the conduit 106 (FIG. 1). The input header 200 directs the gasified water from the water source 102 to a plurality of openings or entry ports (described below) of the reactor block 202. The gasified water is traversed through channels of the reactor block 202, is exposed to radioactive energy, and disassociates into hydrogen and oxygen by radiolysis. In some embodiments, the gasified water may also be exposed to one or both of heat and electricity in addition to radioactive energy to facilitate disassociation thereof. The hydrogen and oxygen generated by such disassociation and any remaining gasified water (i.e., water that was not disassociated) exit the reactor block 202 and enter the offtake header 204. In the embodiment shown in FIGS. 2, 2A, and 2B, the hydrogen, oxygen, and remaining gasified water are delivered via an output port 207 to the separator 118 via the conduit 120 (FIG. 1A). In other embodiments (described below) the reactor block 202 is coupled to an embodiment of an offtake header 204 that includes separate output ports through which the hydrogen and oxygen may be delivered to the storage tanks 112 and 114, respectively.

In one embodiment, the reactor block 202 extends from a bottom end 208 toward a top end 210 along a vertical axis 212, from an input side 214 toward an output side 216 along a horizontal axis 218, and from a front side 220 toward a rear side 222 along a depth axis 224. In a certain embodiment, the vertical, horizontal, and depth axes 212, 218, 224 are substantially orthogonal to one another.

In one embodiment, the input header 200 includes an output port 226 that extends along the vertical axis 212 and spans at least a portion of an input side face 228 of the reactor block 202. The input header 200 includes one or more guiding structure(s) 230 (FIG. 2A) such as manifolds, vanes, and the like that facilitate distribution of the gasified water that enters the input header 200 via the port 206 along the length of the output port 226.

Similarly, the offtake header 204 includes an input port 232 that extends along the vertical axis 212 and spans at least a portion of an output side face 234 of the reactor block 202. The offtake header 204 includes one or more guiding structure(s) 236 (FIG. 2B) such as manifolds, vanes, and the like 236 that facilitate guiding hydrogen, oxygen, and remaining gasified water through the offtake header 204 and through the output port 207.

The input header 200 is defined by an outer wall 238 that surrounds an interior space 240 thereof and the guiding structures 230 so that interior space 240 is isolated from the ambient environment and materials may enter and exit the interior space 240 only through the input port 206 and the output port 226, respectively.

Further, the offtake header 204 is defined by an outer wall 242 that surrounds an interior space 244 thereof and the guiding structures 236 so that interior space 244 is isolated from the ambient environment and materials may exit the interior space 244 only through the input port 232 and out output port 206, respectively.

Continuing to refer to FIGS. 2 and 2A-2E, the reactor block 202 comprises a plurality of reactor plates 246.

In one embodiment, the entirety of the reactor block 202 not covered by the output port 206 of the input header 200 and the input port 232 of the offtake header 204 is surrounded by a cover 248 that separates the interior of the reactor block 202 from the ambient environment. In some embodiments, the cover 248 is a thermal blanket or heat source powered by an electricity source or other energy source 250 (FIGS. 1 and 1A) and maintains the temperature of the reactor block 202 at a predetermined temperature that prevents condensation of the gasified water therein. In addition, the heat provided by the cover 248 exposes the gasified water to thermal energy in addition to radioactive energy and facilitates further disassociation of the gasified water into hydrogen and oxygen. The cover 248 maintains the internal temperature of the reactor block 202 to be at least 100 degrees Celsius. The internal temperature may be maintained at between 100 degrees Celsius and 700 degrees Celsius. In some embodiments, the internal temperature may be maintained at more than 700 degrees Celsius.

Figure 3:
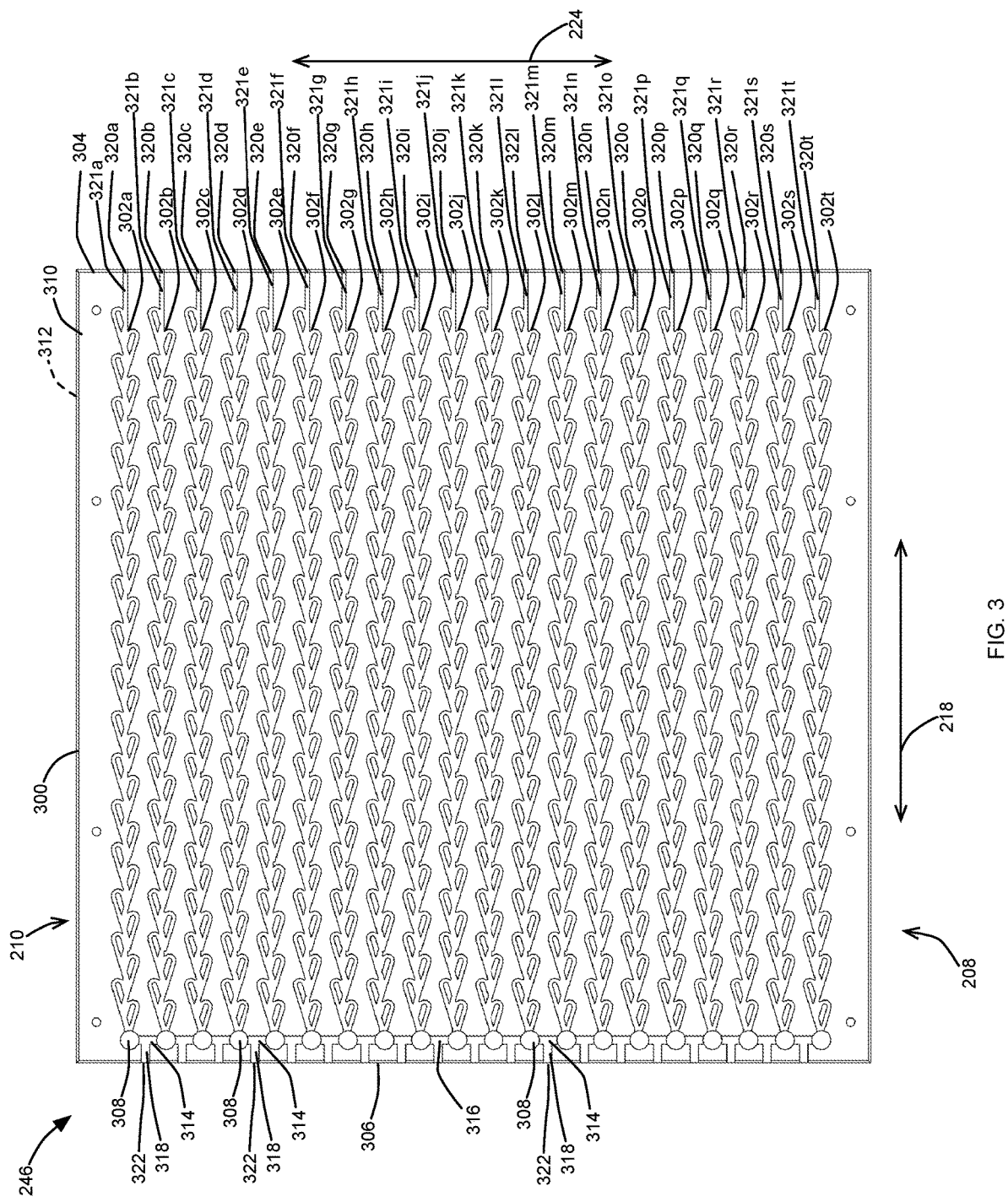
FIG. 3 is a front planar view of a reactor plate of the reactor block of FIG. 2D.

Referring also to FIGS. 3 and 3A, each reactor plate 246 comprises a base plate 300 that has a plurality of channels 302a-302s formed thereon. Each channel 302 extends from a first edge 304 of the base plate 300 (and reactor plate 246) to a second edge 306 opposite the first edge 304. In some embodiments, the channels 302 are formed on only one side of the base plate 300. In other embodiments, identical or different channels 302 are formed on both sides of the base plate 300.

Further, each channel 302 terminates in a via or orifice 308 that extends from a top side 310 of the reactor plate 246 to a bottom side 312 of the reactor plate 246. The via 308 allows fluid (i.e., gasified water, hydrogen, and oxygen) in a first channel 302 of a first reactor plate 246 to flow into a second channel 302 of a second reactor plate 246 adjacent to the first reactor plate 246.

Disposed between each pair of adjacent vias 308 is a connecting channel 314. The connecting channels 314 collectively form a separation channel 316 that extends proximate the second edge 306 in a direction parallel to the vertical axis 224 and from the bottom end 208 to the top end 210 of the reactor block 202 (FIGS. 2 and 2A-2C). In some embodiments, the separation channel 316 extends in a direction perpendicular to the flow of oxygen, hydrogen, and gasified water through the channels 302. In operation, the reactor block 202 is disposed such that the bottom end 208 thereof is closer to the ground than the top end 210 thereof. Thus, as should be apparent to one having ordinary skill in the art, if a mixture of oxygen, hydrogen, and gasified water enters the channel 316, gravity causes the oxygen to tend to separate from the mixture and move toward the bottom end 208, the hydrogen to separate and move toward the top end 210, and the gasified water to move to a position intermediate the bottom and top ends 208, 210.

In some embodiments, each channel 302 also terminates in a first opening 320 along the first edge 304 of the reactor plate 246. In particular, each channel 302 is coupled to the first opening 320 by a connector channel 321. Extending from each connecting channel 310 is a side extension channel 318 that terminates in a second opening 322 along the second edge 306 of the reactor plate 300. Note that for sake of clarity in FIG. 3, reference numbers 308, 314, 318, and 322 are not shown for all of the vias, connecting channels, side extension channels, and second openings disposed that comprise the reactor plate 246.

Referring once again to FIGS. 3, 3A, and 3B, in one embodiment sidewalls and interior bottom 324 of each channel 302 of the reactor plate 246 is coated with a layer 326 of radioactive material such as, for example, thorium, other actinides, and the like. In some embodiments, the interior sidewalls and interior bottom 324 of each channel 302 is coated with a first layer 326 of a first radioactive material, e.g., thorium, and then the first layer 326 is coated with a second layer 328 of a second radioactive material, e.g., other actinides. The two materials are selected, for example, if one material is an alpha emitter and the second material is a beta emitter, and the like.

In some embodiments, all of the channels 302 of all of the reactor plates 246 that comprise the reactor block 202 are coated with the same radioactive material. In other embodiments, some of the channels 302 of all of the reactor plates 246 of the reactor block 202 are coated with the first radioactive material and the remaining channels 302 are coated with the second radioactive material. In still other embodiments, one or more channels 302 of one or more reactor plates 246 are coated with the first radioactive material and the remaining channels of the remaining reactor plates 246 of the reactor block 202 are coated with the second radioactive material.

In some embodiments, the sidewalls and interior bottom 324 of one or more channels 302 are textured to increase the surface area of such sidewalls and interior bottom 324 that may be coated with radioactive material to expose the gasified water to radioactive energy. In some embodiments, the sidewalls and interior bottom 324 are textured with a pyramidal, random pyramidal, inverted pyramidal, spherical, waved, and other types of texture shapes apparent to one who has ordinary skill in the art.

As described above, when gasified water passes through the channels 302, the radioactivity causes disassociation of at least a portion of the gasified water into hydrogen and oxygen gases.

The base plates 300 bonded together to form the reactor block 202 and the cover 248 that encases the reactor block 202 further act as a shield that prevents emission of alpha or beta particles that are generated by the radioactive material used to coat the channels 302 of the reactor plates 246. In addition, in some embodiments, when the reactor block 202 is decommissioned, the reactor block 202 becomes a sarcophagus for the radioactive materials used in reactor plates 246 thereof and may be disposable as low level radioactive waste.

Referring to FIG. 3C, in some embodiments, gasified water in a channel 302a in a first reactor plate 246a may be exposed to radioactive energy from one or more layers 326a, 328a of radioactive material(s) that coat the sidewalls and interior bottom 324a of the channel 302 and also from radioactive material 332 that coats a portion 330 of a rear surface 312b of a second reactor plate 246b adjacent to the first reactor plate 246a. The portion 330 coated in this manner is at least the portion 330 of the rear surface 312b that faces the channel 302a.

In some embodiments, the base plate 300 of the reactor plate 246 is manufactured from stainless steel or another metal or metal alloy. In some embodiments, the base plate 300 is manufactured from a conductive, non-corrosive material. In some embodiments, each base plate 300 has a thickness of between approximately 1 millimeter to 4 millimeters prior to having channels 302 formed therein. In one embodiment, the base plate 300 has a thickness of approximately 2.5 millimeters prior to having channels 302 formed therein. In some embodiments, between 100 and 400 reactor plates 246 may be fused together to form a reactor block 202. It should be apparent that the reactor block 202 may comprise more or fewer reactor plates 246.

In some embodiments, the thickness of the layer of radioactive material applied to the channels 302 formed in the base plate 300 is approximately $1/1000$ inches (i.e., 0.0254 millimeters). It should be apparent, that multiple layers of identical or different radioactive material may be applied atop one another in such channels 302.

Further, in some embodiments, the channels 302, vias 308, connecting channels 314, and side extension channels 318 are formed in the base plate 300 by chemical etching, mechanical cutting, stamping, and the like.

To form the reactor block 202, the reactor plates 246 are secured to one another by, for example, bonding such as diffusion bonding, physical compression, and the like.

In some embodiments, the channels 302 are formed as valvular conduits as disclosed in Tesla, U.S. Pat. No. 1,329,559, the entire contents of which are incorporated herein by reference. In particular, each channel 302 is a valvular conduit that extends from the connector channel 321 toward the via 308 along the directional axis 218. Forming the channel 312 in this manner causes material (gasified water, hydrogen, and/or oxygen) in the channel 302 to move primarily in a direction from the first opening 320 toward the via 308 while reducing the amount of backflow in an opposite direction. Further, as gaseous water in the channel is disassociated into hydrogen and oxygen, the pressure inside the channel increases further urging the flow of hydrogen, oxygen, and remaining gaseous water through the channel 302 toward the via 308. Other types of shapes for the channels 302 apparent to one who has ordinary skill in the art that include characteristics of static mixers or static check valves that promote fluid transport in one direction through the channel 302 may be used instead of or in addition to channels formed as valvular conduits.

Referring once again to FIGS. 1-3, when the extractor 104 is assembled, the output port 206 of the input port 232 is aligned with the plurality of first openings 320 of a first subset 350 of the reactor plates 246 that form the input side face 228 of the reactor block 202. In addition, the input port 232 of the offtake header 204 is aligned with the plurality of second openings 322 of a second subset 352 of the reactor plates 246 that comprise the output side face 234 of the reactor block 202.

Thus, gasified water is introduced into the channels 302 of the first subset 350 of the reactor plates 246 via the first openings 320 thereof. Thereafter, hydrogen, oxygen, and any remaining gasified water flows through the channels 302 of the first subset 350, then through the vias 308 of the reactor plates 246 of the first subset into an intermediate subset 352 of reactor plates 246 disposed between the first subset 350 and the second subset 352. Thereafter, the hydrogen, oxygen, and remaining gasified water flow through the channels 302 of the intermediate subset 354 and into the channels 308 of the second subset 352. From the second subset 352, the hydrogen, oxygen, and any remaining gasified water pass through the channels of the second subset 352 and into the offtake header 204 and is output from the extractor 104.

It should be apparent to one who has ordinary skill in the art that the reactor plates 246 that comprise the first, second, and third subset 350, 352, 354 may be arranged in various configurations relative to one another to increase the amount of time the gasified water therein is exposed to the radioactive energy emitted by the coating that lines the channels 302 of such reactor plates 246. For example, in some embodiments, a group of adjacent reactor plates 246 may be configured so that direction the oxygen, hydrogen, and gasified water traverses through the group changes at each reactor plate. In other embodiments, the group may be configured so the oxygen, hydrogen, and gasified water moves through the reactor plates 246 of the group in an identical direction before being introduced into a further group of reactor plates 246.

In some embodiments, the reactor block 202 comprises one hundred reactor plates 246 bonded or fused to one another. It should be apparent to one who has ordinary skill in the art that the reactor block 202 may comprise more or fewer reactor plates 246.

Figure 4:
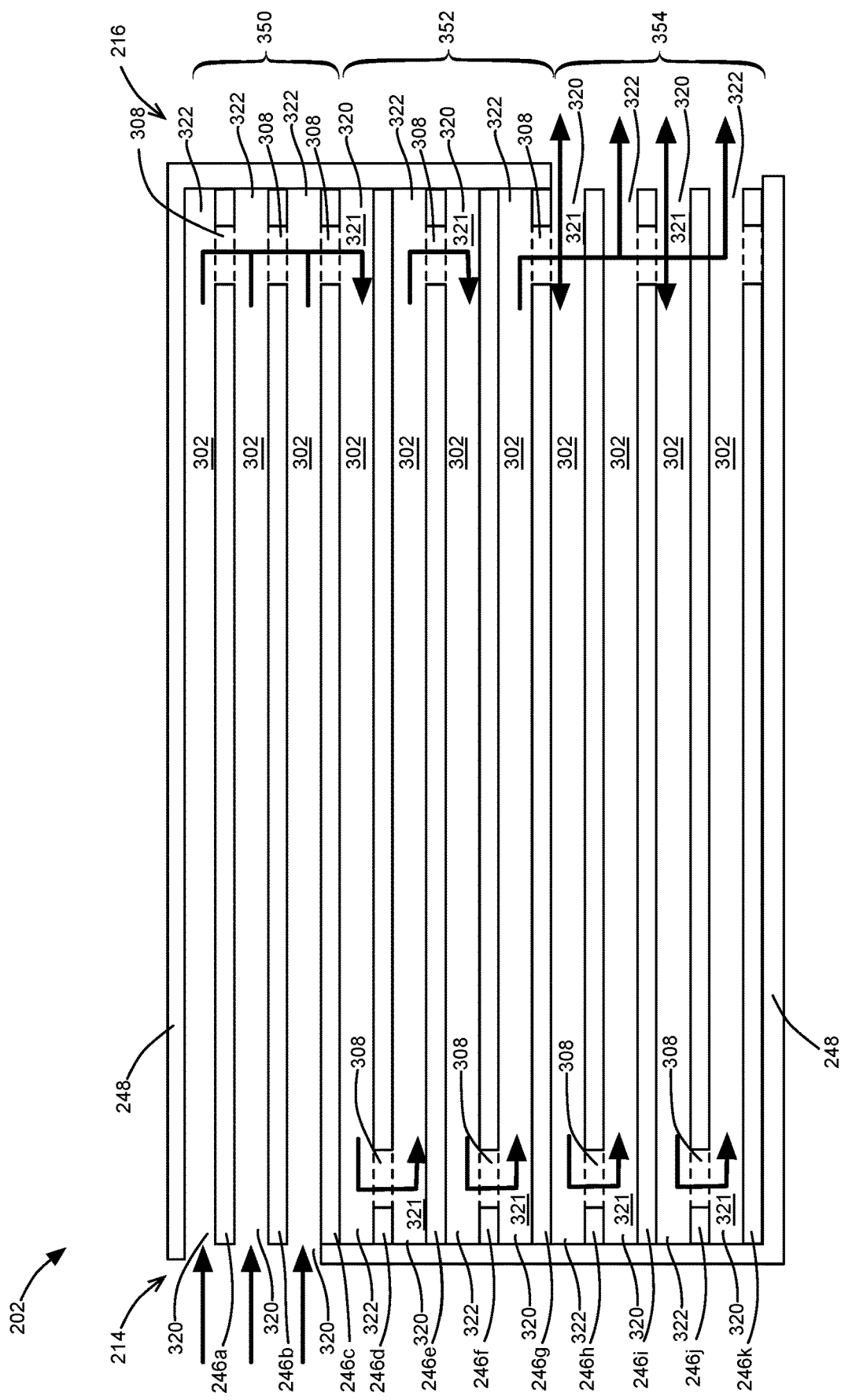
FIG. 4 is a schematic diagram to illustrate flow of material through an embodiment of the reactor block of FIG. 3.

FIG. 4 schematically illustrates how oxygen, hydrogen, and/or gasified water traverse the channels 202 of an embodiment of the reactor block 202. Referring to FIG. 4, the reactor block 220 includes reactor plates 246a-246k. The bold arrows of FIG. 4 show the path taken by oxygen, hydrogen, and/or gasified water through the channels 302 of the reactor plates 246a-246k.

Reactor plates 246a-246c comprise the first subset 350, reactor plates 246d-246g comprise the second subset 352, and reactor plates 246g-246k comprise the third subset 354. As described above, gasified water is introduced into the first openings 320 of the reactor plates 246a-246c of the first subset 350.

The cover 248 blocks the second openings 322 of the reactor plates 246a-246c that comprise the first subset 352, blocks both the first and second openings 320, 322 of the reactor plates 246d-246g that comprise the second subset 352, and blocks the first and second openings 320, 322 of the reactor plates 246h-246k that comprise the third subset 354 and which are not disposed on the output side 216 of the reactor block 322. Thus, the cover 248 contains the oxygen, hydrogen, and gasified water within the reactor block 322 except when ejected from the first and second openings 320, 322 of the reactor plates 246h-246k disposed on the output side 216.

Thereafter, the gasified water traverses the channels 302 of the reactor plates 246a-246c toward the vias 308 thereof and some of the gasified water becomes dissociated into oxygen and hydrogen during such traversal. Oxygen, hydrogen, and gasified water then pass through the vias 208 of the reactor plates 246a-246c into the connecting channel 321 and then the channel 302 of the reactor plate 246d thereof, traverse the channel 302 toward the via 308 of the reactor plate 246d, pass through the via 308 of the reactor plate 246d, and enter the channel 302 of the reactor plate 246e via the connector channel 321 thereof. The oxygen, hydrogen, and gasified water traverse the remaining reactor plates 246f-246k in this manner. As the gasified water traverses the channels 302 of reactor plates 246a-246k and becomes disassociated because of exposure to radiation energy in such channels 302, and any other additional energy sources supplied to the reactor block 202, the concentration of oxygen and hydrogen increases and the concentration of gasified water decreases. Further, as the concentration of oxygen and hydrogen increases relative to that of the gasified water in such channels, the pressure in these channels also increases.

When the oxygen, hydrogen, and gasified water reach the reactor plates 246i-246j, the pressure increases noted above causes a portion of the oxygen, hydrogen, and gasified water to exit the first and second opening of the reactor plates 246i-246j that are not blocked by the cover 248. The remaining portion of the oxygen, hydrogen, and gasified water traverse the channels of these reactor plates 246i-246j until ejected by the second opening 322 of the reactor plate 246j.

It should be apparent to one of ordinary skill in the art that the first, second, and third subsets 350, 352, 354 of reactor plates 246 illustrated in FIG. 4 may comprise more or fewer reactor plates 246 than shown therein.

The oxygen, hydrogen, and gasified water ejected from the first and second openings 320, 322 on the output side 216 of the reactor block 202 may be directed into the offtake header 204 or into first openings 320 that comprise the input of another reactor block 202 (not shown).

In some embodiments, reactor blocks may be arranged in a linear fashion as shown in FIG. 5. Referring to FIG. 5, a linear embodiment of the extractor 104 includes an initial reactor block 400, an intermediate reactor block 402, and a terminal reactor block 404.

The reactor blocks 400, 402, and 404 are substantially identical to the reactor block 202 described above and comprise and input side 214, a plurality of plates 246, an output side 216, and a cover 248. The cover 248 may comprise a combination of one or more face plate(s) that cover(s) the faces of the outermost reactor plates 246 of the reactor blocks 400, 402, 404 and a wrap or shell that encloses the reactor blocks 400, 402, and 404 either individually or in combination. The reactor blocks 400, 402, and 404 may be joined to one another by a bolt, a threaded rod (not shown) that is passed through non-channel portions of these blocks, compressed together, welded together, or any other joining method apparent to one who has ordinary skill in the art.

Referring also to FIG. 3, the input header 200 is coupled to the first openings 320 of the channels 302 formed on the reactor plates 246 of the initial reactor block 400. In some embodiments, the output port 246 of the input header 200 spans all of the first openings 320 of all of the reactor plates 246 that comprise the initial reactor block 400. In other embodiments, the output port 246 of the input header 200 spans only a subset of the first opening 320 of one or more reactor plates 246 of the initial reactor block 400 and the remaining openings are covered by the cover 248 or another covering (not shown).

The second openings 322 of the reactor plates 246 of the initial reactor block 400 disposed on the output side 216 thereof are aligned with and coupled to the first openings 320 of reactor plates 246 on the input side 214 of the intermediate reactor block 402.

In addition, the second openings 322 of the reactor plates 246 of the intermediate block 400 disposed on the output side 216 thereof are aligned with and coupled to the first openings 320 of one or more reactor plates 246 on the input side 214 of the terminal reactor block 404.

In this manner, gasified water is introduced into the first openings 320 of the initial reactor block 400. Thereafter, hydrogen, oxygen, and gasified water flows through the channels 320 and vias 308 of the initial reactor block 400 and is expelled from the second openings 322 of the initial reactor block 400.

The hydrogen, oxygen and gasified water from the second openings 322 of the initial reactor block 400 enters the intermediate reactor block 402 through the first openings 320 of the intermediate reactor block 402. Hydrogen, oxygen, and gasified water flows from the first openings 320 of the intermediate reactor block 400, through the channels 302 and vias 308 of the intermediate reactor block 402, and is expelled through the second openings of the intermediate reactor block 402.

The hydrogen, oxygen, and gasified water from the second openings 322 of the intermediate reactor block 402 enters the first openings of the terminal reactor block 400, traverses the channels 302 and vias 308 of the reactor plates 246 of the terminal reactor block 400, and is expelled through the second openings 322 disposed on the output side 216 of the terminal reactor block 400.

In some embodiments, the intermediate reactor block 402 and the terminal reactor block 404 have an identical number of reactor plates 246 and each of the second openings 322 disposed on the output side 216 of the intermediate reactor block 402 feeds a corresponding first opening 320 disposed on the input side 216 of the terminal reactor block 404.

In other embodiments, for example as shown in FIG. 5A, the intermediate reactor block 402 may have fewer reactor plates 246 than the terminal reactor block 404. In such cases, the second openings 322 of the intermediate reactor block 402 feed the first openings 320 of a subset of the reactor plates 246 that comprise terminal reactor block 404. The hydrogen, oxygen, and gasified water that enter the first openings of the subset of the reactor plates 246 traverse the channels 302 of such subset and are distributed to the remaining reactor plates 246 of the terminal reactor block 404 by the vias 308 that couple the reactor plates 246. In this manner, the hydrogen, oxygen, and gasified water that enter the first openings 320 of the subset of reactor plates 246 traverse the channels 302 of all of the reactor plates 246 that comprise the terminal reactor block 404.

Having more reactor plates 246 in the terminal block 402 provides sufficient space for the increased volume taken the hydrogen and oxygen disassociated from the gasified water by the initial, intermediate, and terminal reactor blocks 400, 402, 404. Further, as should be apparent to one of ordinary skill in the art, having additional volume in the terminal block 404 reduces the pressure exerted by the hydrogen, oxygen, and gasified water in the channels 302 thereof relative to the pressure exerted by these materials in the channels 302 of the intermediate blocks 402. This pressure difference facilitates drawing of material from the channels 302 of the intermediate block 402 into the channels of the terminal block 404.

Hydrogen, oxygen, and gasified water that has not been disassociated enter an input port 408 of an offtake header 406 that is coupled to one or more of the second openings 322 of the terminal reactor block 404. As would be understood by one of ordinary skill in the art, gravity will tend to cause hydrogen to exit second openings 322 that are furthest from the bottom portion 208 of the extractor (assuming the bottom portion 208 is closest to the ground), oxygen to exit second openings 322 that are closest to the ground 208, and any remaining gasified water to exit openings intermediate those furthest and closest to the ground 208. Further, hydrogen, oxygen, and gasified water that enter a cavity 418 of offtake header 406 will tend to separate therein according to weight in a similar manner.

The offtake header 406 includes a first output port 412 and a second output port 414. The first output port is disposed furthest from the bottom portion 208 of the extractor 104 to carry away mostly hydrogen that has gathered near the portion of the cavity furthest from the bottom portion 208. The second output port 414 is disposed proximate the bottom portion 208 of the extractor 104 to carry away mostly oxygen that has gathered near the portion of the cavity nearest the bottom portion 208. Any remaining water may be carried away through the first and/or second ports 412 and/or 414, cooled until condensed, and rerouted to the input port 206 of the input header.

The output ports 412 and 414 of the offtake header 406 may be coupled to the hydrogen and oxygen storage tanks 112, 114 or the separator 118 (FIG. 1).

Although FIGS. 5 and 5A show an extractor with one intermediate reactor block 402, it should be apparent to one of ordinary skill in the art that a plurality of intermediate reactor blocks 402 may be disposed between the initial and terminal reactor blocks 400, 404 to increase the exposure of gasified water to the radioactive material disposed in the channels 308 that comprise the extractor 104.

Figure 6:
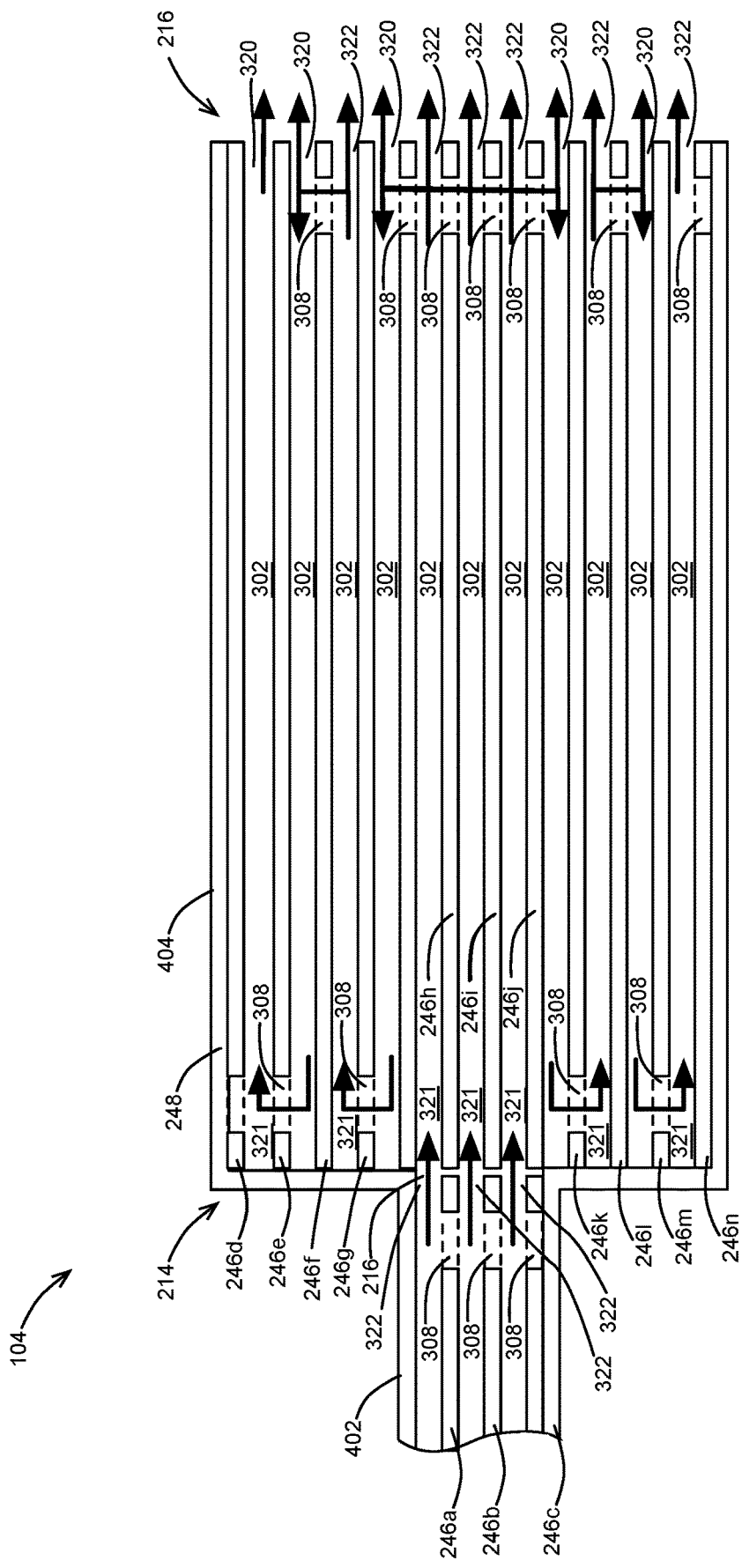
FIG. 6 is a schematic diagram to illustrate flow of material through an embodiment of a reactor of the extractor of FIGS. 5 and 5A.

FIG. 6 schematically illustrates flow of material through an embodiment of the linear extractor 104 shown in FIGS. 5 and 5A. For sake of clarity, the extractor 104 shown in FIG. 6 illustrates the intermediate block 402 having three reactor plates 246a-246c and a terminal block 404 having reactor plates 246d-246n. It should be apparent that in practice the intermediate block 402 and the terminal block 404 may have more or fewer reactor plates 246 shown in FIG. 6.

Referring to FIG. 6, the second openings 322 of the reactor plates 246a-246c on the output side 216 of the intermediate reactor block 402 are configured to feed oxygen, hydrogen, and gasified water to the connector channels 321 of the reactor plates 246i-246j of terminal reactor block 404 via the first openings 320 thereof. As described above in connection with FIG. 4, the oxygen, hydrogen, and gasified water traverse the channels 302 and vias 308 of the blocks 246d-246n. During such traversal, more gasified water becomes disassociated into oxygen and hydrogen, pressure in the channels 302 increases, and the oxygen, hydrogen, and any gasified water not disassociated are ejected through the openings 320 and 322 of the reactor plates 246d-246n that are disposed on the output side 216 of the terminal reactor block 404. It should be apparent to one of ordinary skill in the art that the initial reactor block 400 may feed the intermediate reactor block 402 in a similar manner.

FIGS. 7 and 7A illustrate another embodiment 104a of the linear extractor 104. Referring to FIGS. 7 and 7A, the linear extractor 104 includes an input header 200 and initial reactor block 400 that are identical to those described in connection with FIGS. 5 and 5A. The intermediate reactor block 402a is similar to the intermediate reactor block 402 (FIGS. 5 and 5A) except the base plates 300 that comprise the intermediate reactor block 402a have a trapezoidal shape with an edge of the base plate 300 along the input side 214 of the intermediate reactor block 402a being shorter than the edge of the base plate 300 along the output side 216 of the intermediate reactor block 402a.

Similarly, the terminal reactor block 404a is similar to the terminal reactor block 404 (FIGS. 5 and 5A) except the bases plates 300 that comprise the terminal reactor block 404a have a trapezoidal shape with the edge of the base plate 300 along the input side 214 of the terminal reactor block 404a being shorter than the edge of the base plate 300 along the output side 216 of the terminal reactor block 404a.

The offtake header 406a is similar to offtake header 406 (FIGS. 5 and 5A) except the input port 408a spans a length of the edge of the base plate 300 along the output side 216 of the terminal reactor block 404a beyond the first and/or second openings 320, 322 that are disposed along the output side 216. Thus, the volume of the cavity 418a inside the offtake header 406a is larger than the volume of the cavity 418 of the offtake header 406. Having such greater volume provides additional space for expansion of the oxygen, hydrogen, and gasified water ejected into such volume from the first and/or second openings 320, 322 and improves separation of hydrogen from the oxygen and gasified water. Thus, the concentration of hydrogen emitted from the first output port 412 of the offtake header 406a is higher than the concentration of hydrogen emitted from the first output port 412 of the offtake header 406a and requires less gas separation (or "polishing") after production by the extractor 104.

Further, the expansion of the oxygen, hydrogen, and gasified water ejection into the volumes 418, 418a reduces the pressure therein and facilitates drawing additional oxygen, hydrogen, and gasified water through the reactor block(s) 202 that are coupled to such volumes.

In some embodiments, one or more channels 302 of one or more reactor plates 246 that comprise a reactor block 246 may flare or expand along the path taken by the oxygen, hydrogen, and gasified water therethrough. For example, in some embodiments, the opening of a portion of a channel 302 that feeds a corresponding via 308 may be two or three times the opening of the connector channel 321 that feeds the channel 302. In some embodiments, the dimensions (e.g., the length and width of sides of a rectangular opening or lengths of major and minor axes of an elliptical opening) of the connector channel 321 may be 2 millimeters by 3 millimeters and the dimensions of a portion of the channel proximate the via may be 4 millimeters by 6 millimeters. In other embodiments, the dimensions of the connector channel 321 may be 2 millimeters by 3 millimeters and the dimensions of portion of the channel proximate the via 308 may be 6 millimeters by 9 millimeters. Having the channel 302 flare in this manner may facilitate expansion of gasses generated by disassociation of gasified water in the channel 302 and draw such gasses and gasified water through the channel toward the via 308.

Figure 8:
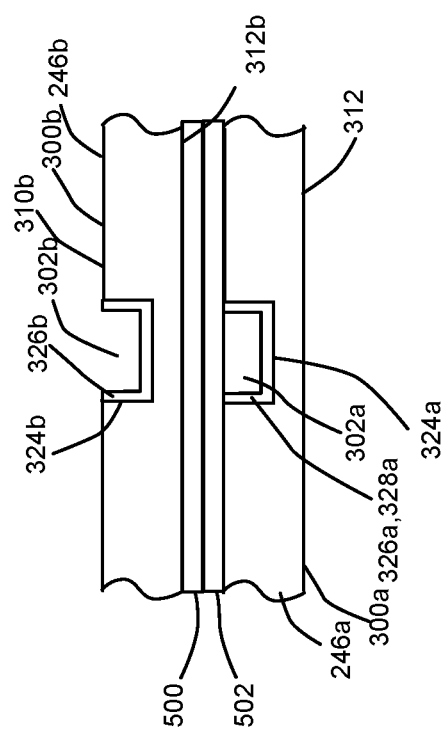
FIG. 8 is an elevational view of portions of another embodiment of the reactor plate of FIG. 3.

Referring to FIG. 8, in some embodiments, a reactor plate 246a adjacent to a reactor plate 246b of one or more of reactor blocks 202, 400, 402, 404 that comprise the extractor 104 may be separated by an insulator 500 secured to the bottom side 312b of the reactor plate 246b and a conductive plate 502 secured to a side of the insulator 500 that faces the first reactor plate 246a. In such embodiments, the base plates 300a,300b and the conductive plate 502 are made of identical or different conductive materials. The electricity source 250 (FIG. 1, 1A) or another electricity source is used to supply a positive (negative) charge to the conductive plate 502 and a negative (positive) charge to the base plate 300a. Supplying different charges to the conductive plate 502 and the base plate 300a facilitates electrolysis of the gasified water in the channel 302a in addition to radiolysis caused by the radioactive material 328a therein.

Figure 2:
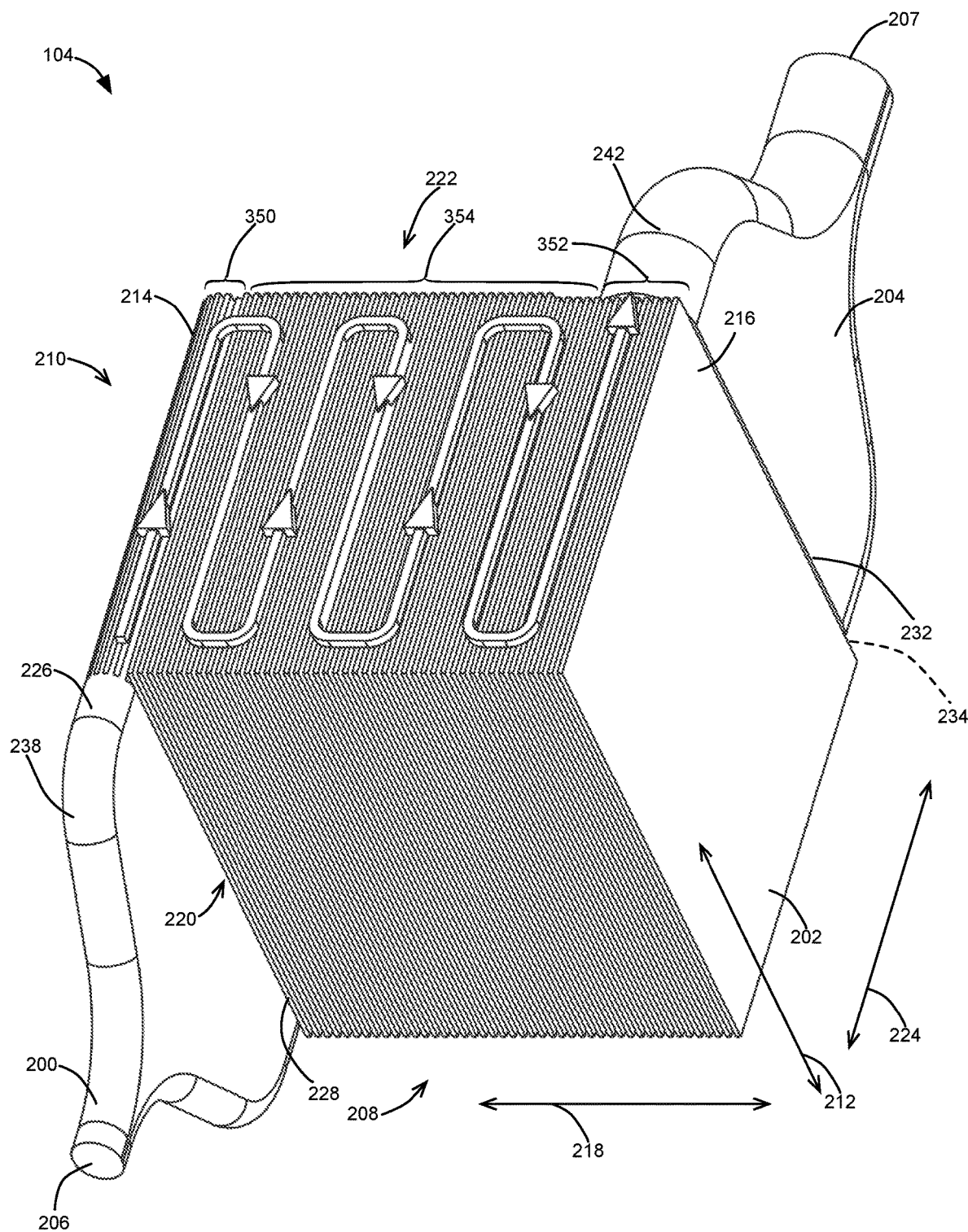
FIG. 2 is an isometric view of an extractor of the hydrogen production systems of FIGS. 1 and 1A.
Figure 2A:
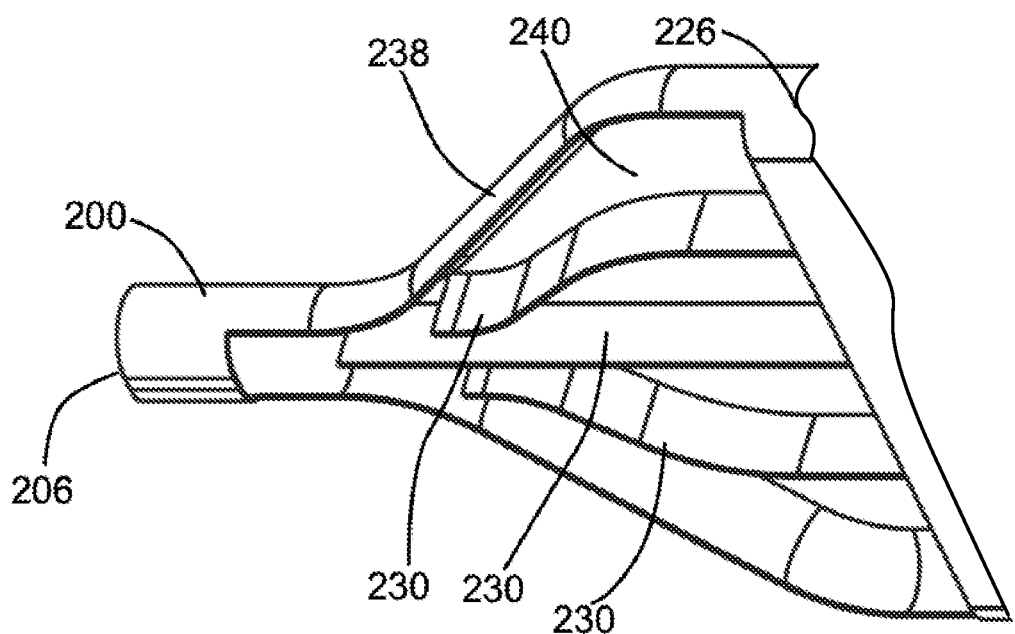
FIG. 2A is a partial isometric view of an input header of the extractor of FIG. 2.
Figure 2B:
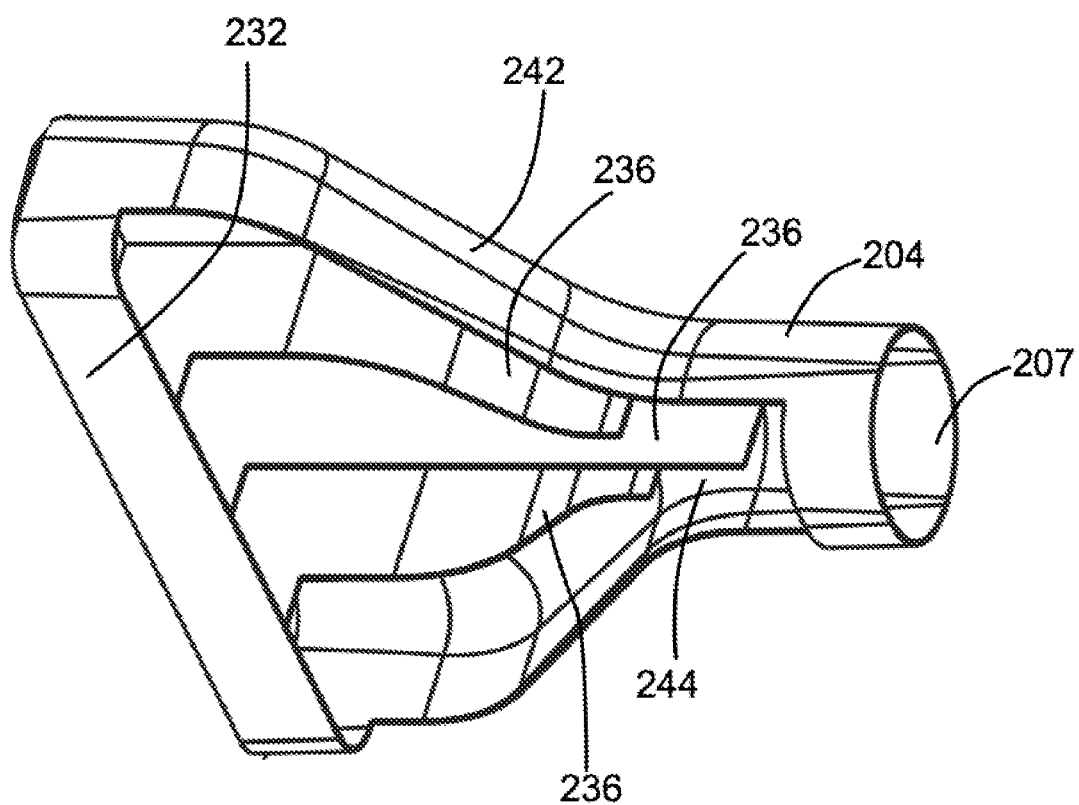
FIG. 2B is a partial isometric view of an offtake header of the extractor of FIG. 2.
Figure 2C:
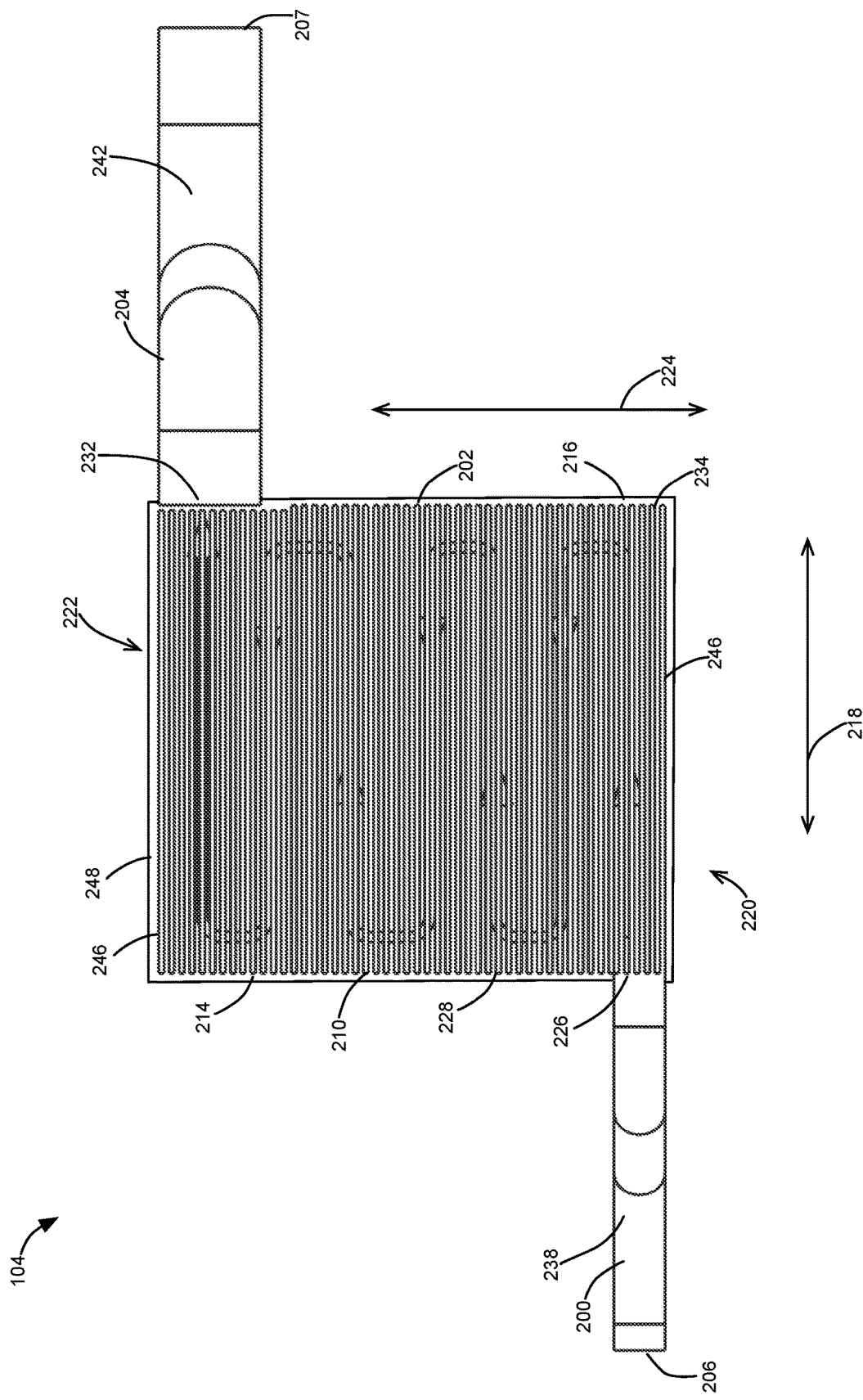
FIG. 2C is a top planar view of the extractor of FIG. 2.
Figure 2D:
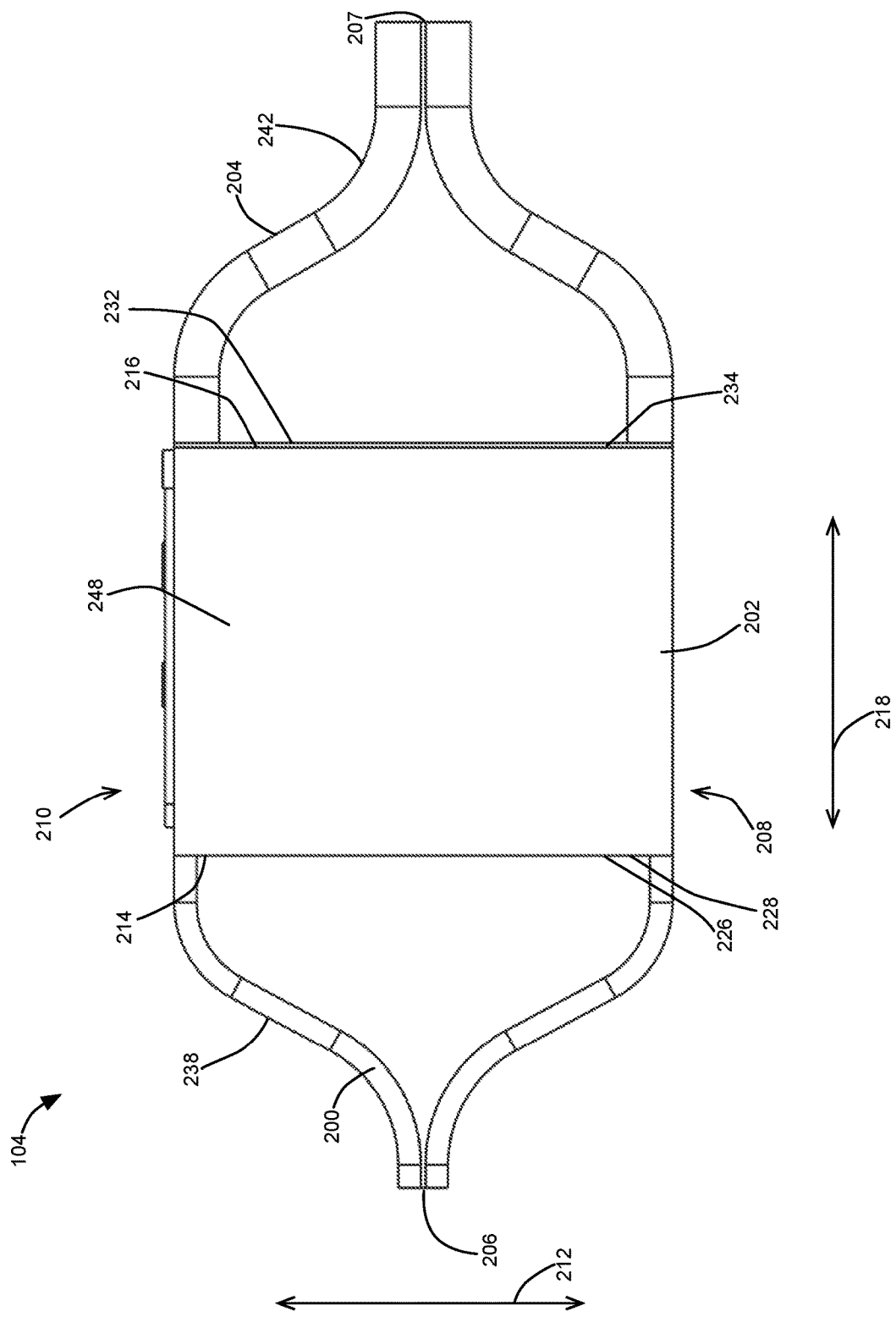
FIG. 2D is a side elevational view of the extractor of FIG. 2.
Figure 9:
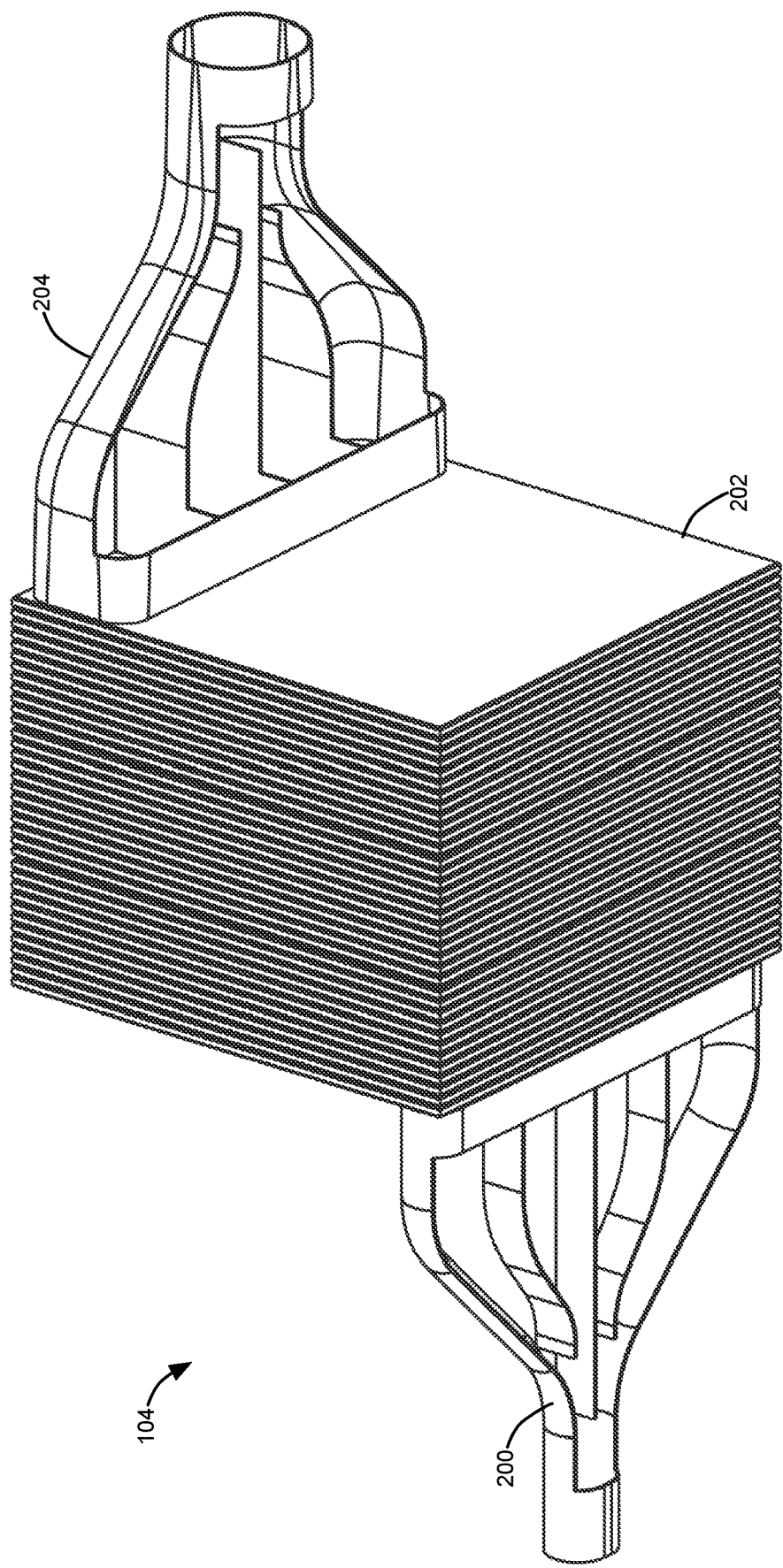
FIG. 9 is an isometric view of a further embodiment of the extractor of FIGS. 1 and 1A.

FIG. 9 shows another embodiment of the extractor that is substantially similar to that shown in FIG. 2 except the input header 200 is coupled to a portion of an input reactor plate 246a of the reactor block 202 and the offtake header 204 is coupled to a portion of an output reactor plate 246b of the reactor block 202. The input header 200 may span either the vias 308 or the connector channels 321 of the reactor plate 246a and the offtake header 204 may span either the vias 308 or the connector channels 321 of the reactor plate 246b. Operation of the reactor block 202 shown in FIG. 9 to disassociate water into hydrogen and oxygen is substantially identical to that described above. Further, it should be apparent to one having ordinary skill in the art that the input header 200, one or more reactor block(s) 202, 400, 402, 406, and the offtake header 202,406 may be coupled to one another in different configurations to form the extractor 104.

In some embodiments, the coating applied to the channels 302 of the reactor plates 246 disclosed herein may be applied using electroplating, anodizing, spraying, annealing of materials, and the like. Further, in some embodiments, an additive manufacturing process may be used to form the reactor plates 246 from, for example, powdered metal for the base plate and powdered radioactive materials for the coating. Other ways of manufacturing reactor plates 246 apparent to one who has ordinary skill in the art may be used.

In some embodiments, the input header 200 is welded or otherwise affixed to the reactor block 202, 400. Similarly, the offtake headers 204, 406, 406a are welded or otherwise affixed to the reactor blocks 202, 404, 404a.

While particular embodiments of the present invention have been illustrated and described, it would be apparent to those skilled in the art that various other changes and modifications can be made and are intended to fall within the spirit and scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A reactor block to extract hydrogen from water, comprising:
   a plurality of reactor plates bonded to one another;
   a plurality of channels formed on at least one side of each reactor plate, each channel coupled to a first opening and a second opening disposed on opposite first and second edges of the reactor plate;
   a radioactive coating applied to each channel; and
   wherein the first opening is configured to receive gasified water and the second opening is configured to eject hydrogen generated by radiolysis of at least a portion of the gasified water as the gasified water is passed through the channel coupled to the second opening.

2. The reactor block of claim 1, wherein the radioactive coating is at least one of thorium, other actinides, another radioactive mater, and a combination thereof.

3. The reactor block of claim 1, further including a plurality of vias formed through each reactor plate, wherein the plurality of vias facilitate movement of the gasified water between channels of adjacent reactor plates.

4. The reactor block of claim 1, further including a separation channel formed on at least one side of each reactor plate, wherein the separation channel couples the plurality of channels of the reactor plate and is disposed to facilitate separation of oxygen and hydrogen generated by the radiolysis of the gasified water.

5. The reactor block of claim 1, wherein the reactor block comprises a first reactor block and further including a second reactor block, wherein the first opening of each channel is configured to receive oxygen, hydrogen, and gasified water ejected from the second reactor block.

6. The reactor block of claim 1, wherein the reactor block comprises a first reactor block, the second opening is further configured to eject gasified water, and further including a second reactor block, wherein the second reactor block receives the ejected gasified water.

7. The reactor block of claim 6, wherein second reactor block generates additional hydrogen by disassociating the ejected gasified water and further including an offtake header coupled to a hydrogen storage tank.

8. The reactor block of claim 1, wherein at least a portion of the reactor plates are coupled to an electrical source to facilitate disassociation by electrolysis of the gasified water not disassociated by radiolysis.

9. The reactor block of claim 8, wherein the reactor block is coupled to a heat source, wherein the heat source facilitates disassociation by thermal energy of the gasified water not disassociated by radiolysis and electrolysis.

10. The reactor block of claim 1, wherein a reactor plate of the plurality of reactor plates includes the plurality of channels formed on one side thereof and a portion of a second side of the reactor plate opposite at least one of the plurality channels is coated with an additional radioactive material.

11. The reactor block of claim 1, wherein at least one of the channels is a valvular conduit.

12. A method of extracting hydrogen from water, comprising:
    introducing gasified water into a first opening of each channel of a plurality of channels formed on a reactor plate, wherein each channel is coated with a radioactive material; and
    ejecting from a second opening of each channel, hydrogen generated by radiolysis of at least a portion of the gasified water as the gasified water is passed through the channel.

13. The method of claim 12, wherein the radioactive coating is at least one of thorium, other actinides, another radioactive mater, and a combination thereof.

14. The method of claim 12, wherein the channel comprises a first channel, further including causing gasified water to move through a via formed in the reactor plate from the first channel to a second channel of an adjacent reactor plate.

15. The method of claim 12, further including directing hydrogen and oxygen generated by the radiolysis of the gasified water into a separation channel formed on at least one side of each reactor plate, wherein the separation channel couples the plurality of channels of the reactor plate and is disposed to facilitate separation of the oxygen and the hydrogen.

16. The method of claim 12, wherein the reactor plate comprises a first reactor plate and further including supplying oxygen, hydrogen, and gasified water to each first opening of the first reactor plate from a channel of another reactor plate.

17. The method of claim 12, further including ejecting gasified water from the second opening and providing the ejected gasified water to a further channel of a further reactor plate.

18. The method of claim 17, wherein further channel generates additional hydrogen by disassociating the ejected gasified water passed therethrough and directing the additional hydrogen into an offtake header coupled to a hydrogen storage tank.

19. The method of claim 12, further including exposing gasified water in the plurality of channels not disassociated by radiolysis to electrical or thermal energy.

20. The method of claim 12, further including exposing gasified water in at least one channel of the plurality of channels to radioactive energy emitted by a coating applied to a side of an adjacent reactor plate that faces the channel.

* * * * *